United States Patent Office 3,105,512
Patented Oct. 1, 1963

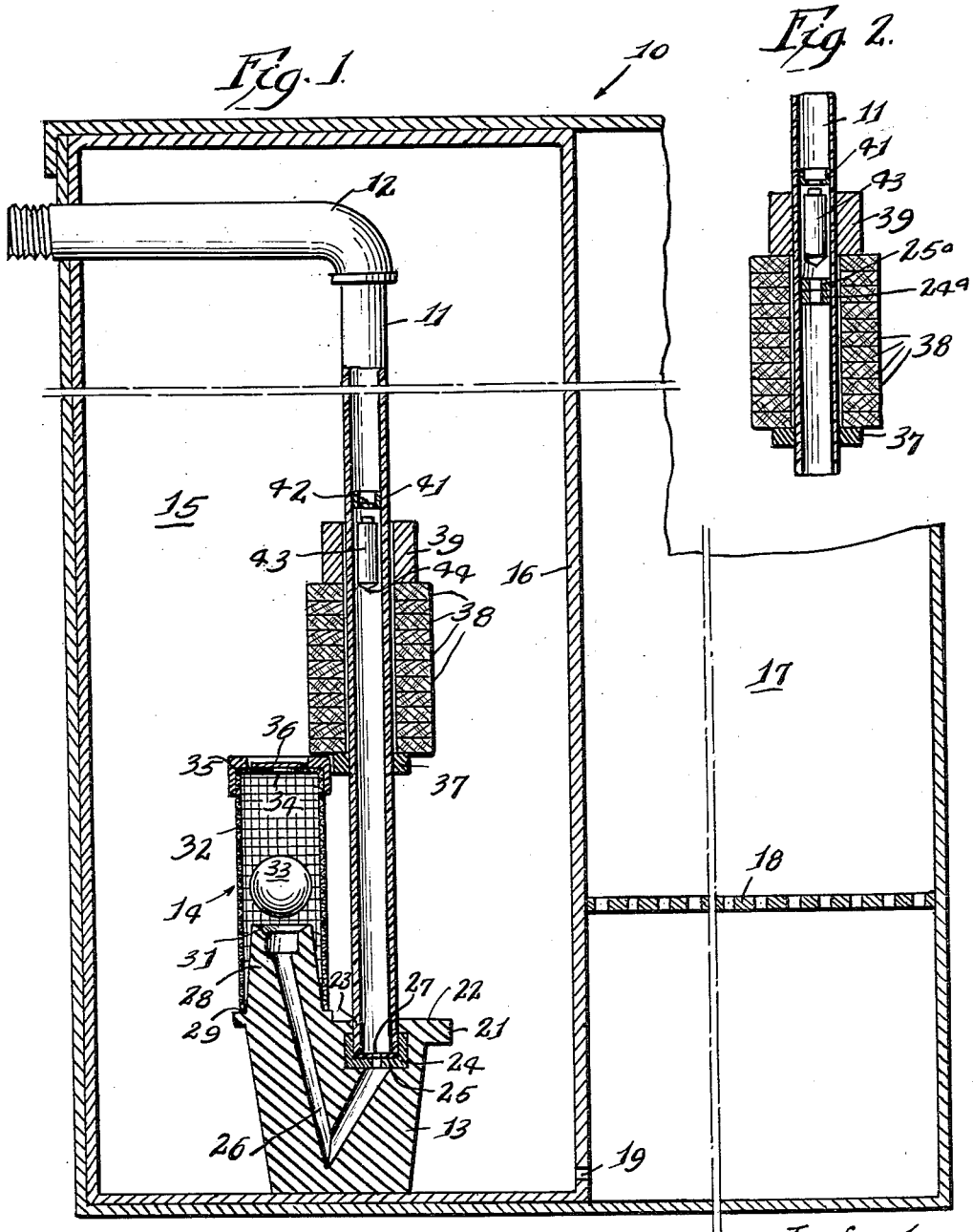

3,105,512
SAFETY SHUT-OFF VALVE
Charles E. Lyall, Deerfield, and Edwin A. Morrison, Highland Park, Ill., assignors to Culligan, Inc., Northbrook, Ill., a corporation of Delaware
Filed Sept. 17, 1962, Ser. No. 223,979
8 Claims. (Cl. 137—416)

The present invention relates to a novel safety shut-off valve and more particularly to a shut-off valve to be utilized in a regenerant storage tank of an automatic water softening or conditioning system providing a positive shut-off for the prevention of overflow where there is leakage or failure in the valve system supplying liquid under pressure to the tank.

Previously brine storage tanks or containers have relied upon valving arrangements actuated by the liquid level in the container through floats or similar means to control the amount of liquid entering the container. More recently, systems have been devised to control the amount of liquid to be fed to the container based upon a predetermined time interval and flow rate. Such a system is shown in the copending Mahlstedt application Serial No. 136,556, filed September 7, 1961, entitled "Time Control Brine Refill System" which relies upon a solenoid-actuated diaphragm valve assembly to control the flow of liquid under pressure into the brine storage tank.

One problem arising with a time controlled refill of the brine storage tank with water for the production of saturated brine is leakage or failure of the valve and the attendant difficulty arising from overflow of the storage tank. This is especially true in home-owned automatic units where drainage onto floor or furnishings from the brine overflow might result in costly replacement or repairs. Under normal operation, liquid under pressure is available to the regenerant tank for the total service cycle of the water conditioner or softener and is controlled by a suitable valve interposed between the softener and the brine tank. This valve is opened for a predetermined period of time to allow sufficient water to enter the storage tank to produce the requisite amount of brine for a regeneration cycle.

If the valve leaks or fails, the liquid under pressure will enter the storage tank in an amount greater than required under normal conditions for a regeneration cycle and may cause overflow of the tank. To prevent this situation, the present invention provides a valve member in the conduit in the brine storage tank which normally floats above its valve seat due to a magnetic member surrounding the conduit. If the level in the tank rises above the normal height, the magnetic member is lifted until the magnetic attraction with the valve member is diminished to the point where the valve member is seated to prevent further flow.

An important object of the present invention is the provision of a novel safety shut-off valve which normally floats in the liquid stream and will seat on an associated valve seat when the liquid level in the storage tank increases beyond the normal level. Once the valve is located on its associated valve seat, there can be no further flow to the storage tank without the resetting of the valve member.

Another object of the present invention is the provision of a novel shut-off valve that is magnetically actuated to a floating position, and the magnetic actuation means will move away from the valve member when the liquid level rises above its normal height to decrease the magnetic attraction until the weight of the valve member causes it to fall and abut its valve seat. A valve stop member is located in the brine conduit above the normal position of the valve member to limit upward movement when the magnet is lifted upward and thus decrease the magnetic field until the valve member drops due to its own weight.

A further object of the present invention is the provision of a novel shut-off valve which may reset itself upon eduction of the liquid from the storage tank to lower the magnetic means to a position where the magnetic attraction will again lift the valve member from its seat.

The present invention also comprehends the provision of an adjustable magnetic member surrounding the brine conduit which normally attracts the valve member and will be lifted by associated float segments when the liquid rises above its normal level.

Further objects are to provide a construction of maximum simplicity, efficiency, economy and ease of assembly and operation, and such further objects, advantages and capabilities as will later more fully appear and are inherently possessed thereby.

In the drawing:

FIGURE 1 is a view in vertical cross section of the novel safety shut-off valve which is incorporated in the air eliminator assembly of a brine storage tank.

FIG. 2 is a partial cross-sectional view of an embodiment of the safety shut-off valve involving an automatic reset arrangement.

Referring more particularly to the drawing in which is illustrated the novel embodiments of the present invention, FIG. 1 discloses a brine storage tank 10 having a brine conduit 11 connected to a brine line adapter 12 leading to a conduit communicating with a time controlled valve (not shown) for feeding a predetermined amount of water through the conduit 11 to the brine tank 10. The brine conduit 11 terminates at the bottom of the brine tank in the valve base 13 for an air eliminator valve assembly 14.

The brine conduit 11 and air eliminator valve assembly 14 are both positioned in the brine storage chamber 15 of the brine tank 10. A partition 16 separates this chamber from a salt storage chamber 17 where the salt to be contacted by water to produce brine rests on a horizontal perforated plate 18. Openings 19 in the partition 16 communicate between the chambers 15 and 17. The valve base 13 is an irregularly shaped block of a resilient material which may rest on the bottom of the chamber 15 or be supported by a flange 21 in a suitable supporting plate (not shown). The base has a flat area or upper surface 22 with an opening 23 to receive an end of the conduit 11. This opening is shouldered to provide for a cup-shaped valve seat support 24 and a flat resilient valve seat 25 rests on the support 24 and is held therein by abutment of the end of the conduit 11.

A generally V-shaped passage 26 communicates with the central openings 27 in the support 24 and valve seat 25 and extends upwardly into a slightly tapered projection 28 for the air eliminator valve assembly 14. The projection is provided with an annular shoulder 29 at its base and an enlarged valve seat 31 is formed at the upper end of the projection and communicates with the passage 26. A cylindrical screen or cage 32 closed at one end fits over the projection 28 and abuts the shoulder 29 with the screen snugly fitting onto the projection adjacent the shoulder 29. A buoyant ball valve 33 is enclosed within the screen cage for limited movement due to the liquid in the chamber 15. A small opening 34 is formed in the closed end of the cage to allow for the escape of any entrapped air in the cage which cannot escape through the mesh of the screen. A check valve 35 formed of a resilient material has a central flap 36 covering the opening 34 to prevent the escape of liquid or impurities through the opening from the chamber 15.

A ring 37 of resilient material on the conduit 11 acts as an adjustable stop for a float also surrounding the conduit.

The float comprises a plurality of buoyant flat ring-like float segments 38 surrounding the conduit 11 which will move up and down the conduit as the liquid level varies in the tank. Resting on the float segments is an annular magnet 39 which also surrounds the conduit 11; the conduit acting as a guide for the magnet 39 and the float segments 38.

Within the conduit and slightly above the normal level of the magnet 39 is a valve stop member 41 press fitted in the conduit and having a central opening 42 to allow for flow of liquid in either direction through the conduit 11. Below the stop member 41 is a valve stem or member 43 of a diameter smaller than the interior diameter of the conduit and formed of a magnetic material. This valve stem has a conical lower end 44 which is adapted to seat in the opening 27 in the resilient valve seat 25. The valve stem is normally attracted by the magnet 39 and floats within the conduit 11 and the surrounding annular magnet.

During normal operation, a predetermined quantity of water passes through the conduit 11 to the brine tank to contact the salt and produce brine during a service cycle of a water softener or conditioner. During a regeneration cycle, brine is educted from the tank through the conduit 11 until the ball valve 33 seats on the valve seat 31 terminating flow. The flow to the tank is controlled by a valve actuated on a timed interval basis for refill of the tank. The valve stem 43 is of a geometric shape to permit the flow of water or brine past the valve stem and between the valve stem and conduit 11 as well as through the stop member or valve restrictor 41.

Should there be any malfunction of the time fill brine system causing an excessive flow of water to the brine tank 10, the brine tank will fill raising the float segments 38 and magnet 39 above their normal position. The magnetically attracted valve stem 43 will also rise until it abuts the valve stop member or restrictor 41. As the magnet 39 and float segments 38 continue to rise, the magnetic field of the magnet 39 will be raised above the valve stem 43 until the weight of the valve stem and the downward flow of water in the conduit 11 overcomes the field causing the valve stem to fall and seat on the resilient valve seat 25. Further flow of water will increase the pressure within the conduit 11 causing the valve stem 43 to seat tightly against the resilient valve seat 25 preventing further filling of the brine tank 10 and subsequent brine tank overflow.

Eduction of the contents of the tank is permitted by the valve stem 43, but the magnet 39 will not be lowered to such an extent as to attract the valve stem to resume its former floating position. Thus, when water enters the conduit 11 for the next refill, the valve stem 43 seats tightly against the valve seat 25 preventing any new production of brine, and this situation maintains until the valve stem 43 is reset. To accomplish the resetting, the pressure needs to be relieved and the conduit 11 and attendant structure removed from the brine tank 10. This conduit is then tipped upside down so that the valve stem 43 returns to its original position and remains there due to the magnetic field. Then the structure is replaced and connected to the time fill brine system.

This device also provides a fail-save factor should rough handling dislodge the valve stem 43 causing it to seat on the valve seat 25. Also, this seating will occur should the residual magnetism be lost from the magnetic member 39. In these two cases, like the situation of malfunctioning of the time fill system, subsequent refill cycles could not be completed until the valve stem 43 is reset in the magnetic field.

FIG. 2 illustrates a modification of the present invention where the resilient valve seat 25a and the valve seat support 24a is conformably located within the conduit 11 slightly below the normal position of the valve stem 43. The float segments 38, magnet 39 and valve restrictor 41 are positioned as in FIG. 1, and operation and seating of the valve stem 43 occurs in the same manner. However, to reset the valve stem 43, the brine is educted from the brine tank allowing the float segments 38 and magnet 39 to return to their normal positions on the valve stop 37. Then the magnetic field having sufficient strength will lift the valve stem 43 from the seat 25a back to its original position, thus automatically resetting the valve. This modification provides a device that will enable a softener to function with no overflow of the brine tank. However the only way to determine that the time fill system has failed, since the softener attached thereto will continue to function, is by the fact that more salt will be used than is consumed under normal conditions and a service man can check this when he makes his salt delivery.

The level at which the magnetic attraction of the magnet 39 for the valve stem 43 will fail can be predetermined by the number of float segments 38 comprising the total float assembly. Such segments can be of a thickness equivalent to a brine tank liquid level in increments of gallons of water per pound of salt or directly in pounds of salt. Thus a brine tank with a given time fill salt dosage setting in pounds of salt could be provided with float segments equivalent to two or three extra pounds of salt. Then only a predetermined amount of water would flow due to malfunction before the safety mechanism would stop further flow to the brine tank.

While the improvement has been shown and described as being advantageously applicable to a brine refill system for an automatic water conditioner, it is not our desire or intent to unnecessarily limit the scope or the utility of the improved features by virtue of this illustrative embodiment.

Having thus disclosed the invention, we claim:

1. A safety shut-off valve for use in a timed refill system in a brine storage tank, comprising a conduit leading to the storage tank for supplying water thereto and removing brine and terminating in a base, a resilient valve seat mounted in the conduit, an adjustable stop member mounted on the exterior of the conduit, float members encompassing the conduit and normally resting on said stop member, a magnetic member encompassing said conduit and resting on said float members, a magnetically attractive valve stem normally floating within the conduit due to the magnetic field of said magnetic member, and a valve stem stop member in said conduit above said valve stem, said last mentioned stop member being so positioned that if excess water passes through the conduit to the storage tank, the float members will lift said magnet member above said last mentioned stop member and said valve stem will be lifted to abut the last mentioned stop member and then fall to seat on said valve seat when the magnetic field decreases, the water pressure causing the valve stem to remain tightly seated on said valve seat.

2. A safety shut-off valve as set forth in claim 1, including a cup-shaped valve seat support mounted in said base and receiving therein the end of said conduit, said valve stem being clamped between the end of said conduit and said support.

3. A safety shut-off valve as set forth in claim 2, in which the valve stem stop member, valve seat and valve seat support have central openings for fluid flow in either direction.

4. A safety shut-off valve as set forth in claim 1, in which said valve stem is so contoured as to permit fluid flow past the valve stem in either direction.

5. A safety shut-off valve as set forth in claim 1, in which a valve seat support is mounted within said conduit slightly below said valve stem with said valve seat resting thereon, such that after said valve stem is tightly seated on said valve seat, the magnetic member and float members may be repositioned by eduction of the brine from the tank and the magnetic field will lift the valve stem off of the valve seat.

6. A safety shut-off valve for a solution storage tank to prevent overflow, comprising a fluid conduit in said tank communicating at one end with a source of fluid pressure or vacuum, said conduit terminating at its opposite end in a base, a valve seat in said base, a valve stem in said conduit and adapted to seat on said valve seat to cut off flow to said tank, magnetic means attracting said valve stem to cause said stem to float in said conduit above said valve seat, and means to lift said magnetic means away from said valve stem and thereby reduce the magnetic attraction therebetween until said valve stem falls onto said valve seat.

7. A safety shut-off valve for a chemical solution storage tank to prevent overflow thereof, comprising a fluid conduit in the tank communicating at one end with a source of alternate fluid pressure and vacuum and terminating at the opposite end in a base, a valve seat positioned within said conduit, valve means in said conduit normally allowing flow in either direction, means on the exterior of said conduit causing said valve means to normally float in said conduit, and means to lift said last named means and to cause the valve means to drop onto said valve seat.

8. A safety shut-off valve as set forth in claim 7, in which the last mentioned means includes means limiting upward movement of said valve means in said conduit.

No references cited.